United States Patent [19]

Tsuboi et al.

[11] 4,020,411
[45] Apr. 26, 1977

[54] STATIC POWER CONVERTER CONTROLLING APPARATUS FOR REDUCING NOISE GENERATED BY PHASE SHIFT CONTROL

[75] Inventors: Takashi Tsuboi, Katsuta; Kyozo Tachibana, Naka; Kaoru Tamura, Hitachi; Fujimaro Imaizumi, Katsuta, all of Japan

[73] Assignee: Hitachi, Ltd., Japan

[22] Filed: Feb. 21, 1975

[21] Appl. No.: 551,663

[30] Foreign Application Priority Data

Feb. 21, 1974 Japan .............................. 49-20669

[52] U.S. Cl. .................. 321/27 R; 307/58; 307/82; 321/9 R; 321/46
[51] Int. Cl.² ...................................... H02M 1/00
[58] Field of Search ........... 321/1, 8 R, 9 R, 27 R, 321/46, 47; 318/345; 307/52, 54, 63, 58, 82

[56] References Cited

UNITED STATES PATENTS

| 3,419,786 | 12/1968 | Brane | 321/27 R |
| 3,599,076 | 8/1971 | Boksjo et al. | 321/27 R |
| 3,842,335 | 10/1974 | Boksjo | 321/27 R |

FOREIGN PATENTS OR APPLICATIONS

| 2,254,937 | 3/1974 | Germany | 321/27 R |

*Primary Examiner*—Gerald Goldberg
*Attorney, Agent, or Firm*—Craig & Antonelli

[57] ABSTRACT

A static power converter includes a plurality of thyristor bridges. The level of the control voltage is measured and a signal representative of the measured level is generated which causes one thyristor bridge to maintain a substantially zero output D.C. voltage, while another thyristor bridge operates with phase shift control.

4 Claims, 15 Drawing Figures

STATIC POWER CONVERTER CONTROLLING APPARATUS FOR REDUCING NOISE GENERATED BY PHASE SHIFT CONTROL

FIELD OF THE INVENTION

This invention relates of a static power converter, particularly one comprising a number pf thyristor bridges, for the conversion of A.C. power into D.C. power and vice versa.

BACKGROUND OF THE INVENTION

Static power converters comprising a number of thyristor bridges driven to full output and capable of operating as rectifiers or, if necessary, as inverters are used in A.C. powered vehicles. In vehicles equipped with converters of this type, propulsion as well as regenerative braking is possible, and this constitutes an advantage from the point of view of saving energy.

In the regenerative-braking mode, the drive motors of the vehicle during the deceleration of the latter work as generators, and in the above-described application the D.C. power generated by the motors is converted into A.C. power. The converted A.C. power is fed to the overhead conductor. While this takes place, the phase shift control angle $\alpha$ of each thyristor must be limited to a maximum phase angle of $180° - \gamma$, so that the thyristor operates with a safety angle ($\gamma$ denotes the minimum control advance angle). Neglecting the overlap angle, $\gamma$ equals the safety angle. Hereinafter, the safety angle will be referred to as $\gamma$. The overlap angle will be disregarded for the sake of simplification. The angle $\gamma$ is usually between 40 and 50°, to enable the thyristor to cease conducting.

The limitation of the phase shift control angle $\alpha$ introduces the disadvantage that the harmonics in the A.C. circuit become greater than in the case of a powered vehicle operating with a number of rectifier bridges driven to only half their output and used to control propulsion but not regenerative braking. These harmonics induce noise voltages which should be avoided as far as possible in telecommunication cables laid parallel with the overhead conductor.

DESCRIPTION OF THE PRIOR ART

A known control circuit, in which the harmonic and the psophometrically evaluated noise current is generally taken as a measure of noise signal strength, will be initially discussed.

Figure 1A:
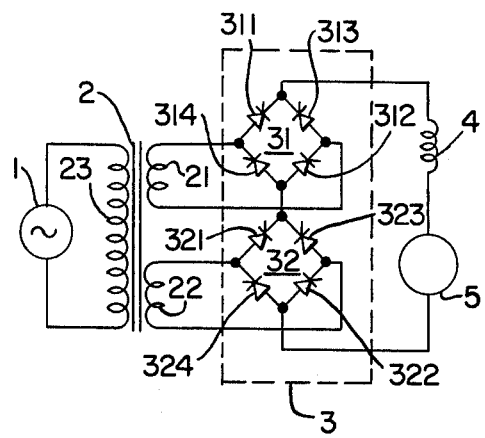
FIGS. 1a and 1b show a diagram of the main circuit of a known static power converter and a known control system, respectively.
Figure 1B:
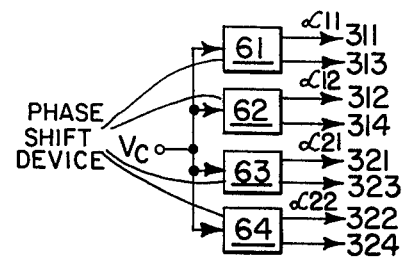

According to FIG. 1a, the main circuit of a typical A.C. powered vehicle capable of regenerative braking comprises an A.C. source 1 to which the primary coil 23 of a transformer 2 is connected. The transformer usually comprises several secondary coils, in the present case the two coils 21 and 22, a thyristor bridge, which can be driven to its full output (31 and 32 respectively), being connected to each of these coils. The number of secondary coils of transformer 2 corresponds to the number of thyristor bridges. Each thyristor bridge consists of four thyristors, i.e. 311, 312, 313, 314 and 321, 322, 323, 324 respectively. The two thyristor bridges 31 and 32 are connected in parallel on the A.C. side, and in series on the D.C. side. The two thyristor bridges, which are series-connected on the D.C. side, supply a motor 5 via a reactor coil 4. The thyristors 311, 313; 312, 314; 321, 323 and 322, 324 are ignited in dependence on the phase shift control angles $\alpha_{11}$, $\alpha_{12}$, $\alpha_{21}$ and $\alpha_{22}$ respectively. Phase shift control is carried out with the aid of phase shift devices 61, 62, 63 and 64 (FIG. 1b).

With this power converter, the output D.C. voltage can be controlled in the positive and negative regions, in dependence on a control voltage $V_c$, by varying the phase shift control angles $\alpha_{11}$ to $\alpha_{22}$. To facilitate matters, assume that the direct current $I_D$ flows continuously. Then, the direct voltage $E_{D1}$, $E_{D2}$ of the thyristor bridges 31 and 32 respectively follows the equations:

$$E_{D1} = 0.9 E_{21} \frac{\cos \alpha_{11} + \cos \alpha_{12}}{2} \quad (1)$$

$$E_{D2} = 0.9 E_{22} \frac{\cos \alpha_{21} + \cos \alpha_{22}}{2} \quad (2)$$

wherein $E_{21}$ and $E_{22}$ denote the r.m.s. alternating voltage of each secondary coil 21 and 22 of transformer 2.

Figure 2:
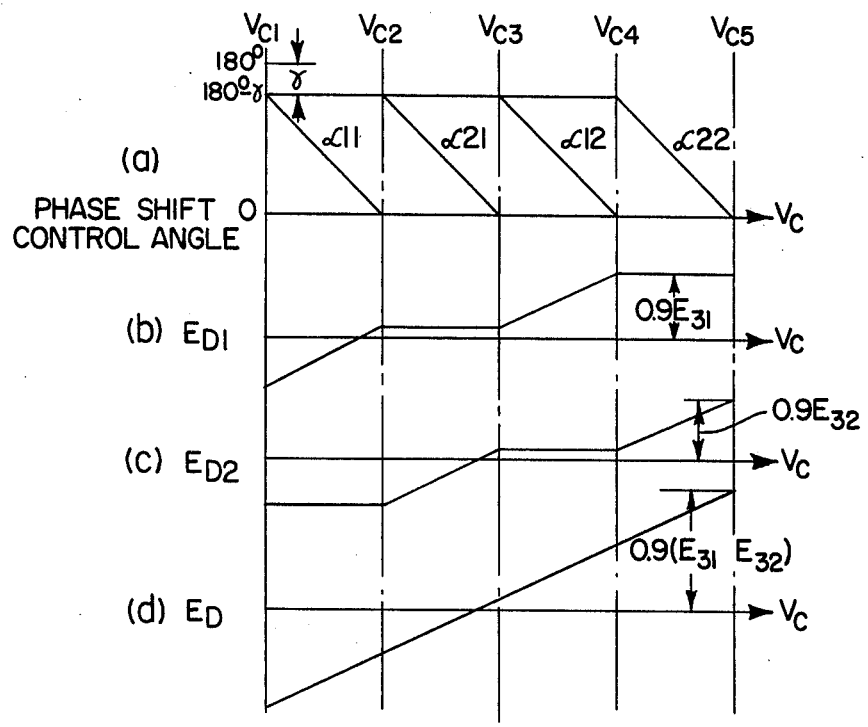
FIGS. 2 and 3 are diagrams displaying the variations of the several direct voltages in dependence on the phase shift control angle, as well as direct voltage and alternating voltage characteristics.

Various methods are available for controlling the phase shift control angles $\alpha_{11}$ to $\alpha_{22}$. In order to improve the power factor, the phase shift control angles are varied according to the control voltage $V_c$ ($V_{c1}$ to $V_{c5}$) in a certain order (FIG. 2a). With this type of control, the output voltages $E_{D1}$ and $E_{D2}$ of the thyristors 31 and 32 vary, according to equations (1) and (2), as shown in FIGS. 2b and 2c. The full direct voltage $E_D$ (FIG. 2d) represents the sum total of the voltages $E_{D1}$ and $E_{D2}$. The direct voltage may assume any desired value between the negative and positive regions. In the negative region of voltage $E_D$, the static power converter 3 operates as an inverter. That is to say, power is transferred back from the direct current side to the alternating current side.

Figure 3:
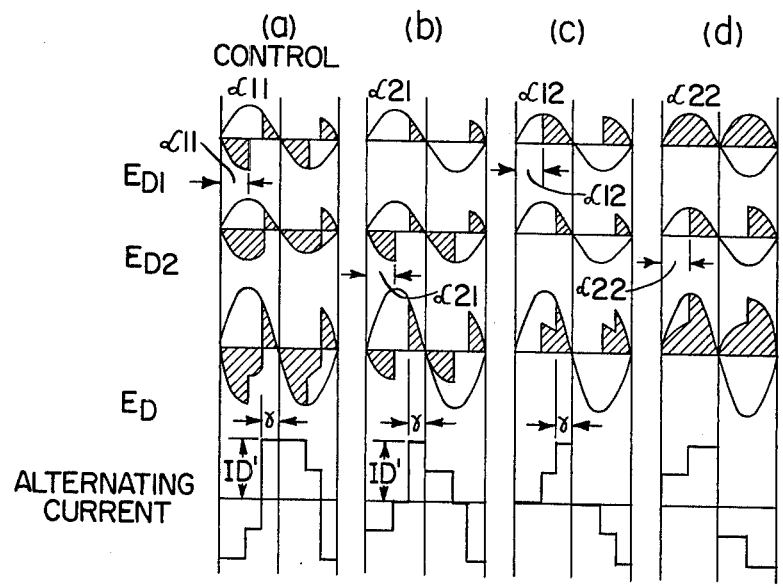

FIG. 3 shows the waveform of the direct voltages and of the current in the primary coil of the transformer in the case of the above-described control system when the direct current $I_D$ is completely smoothed. The amplitude $I_D'$ of the alternating current has been shown as having a value at which the amplitude of the direct current $I_D$ is computed from the transfer ratio of the transformer.

As can be seen from the alternating current waveforms shown in FIGS. 3b and 3c, power is converted efficiently according to the control mode illustrated in FIG. 2a for a low direct voltage $E_D$, because then also the r.m.s. value of the alternating current is low. The power factor can be further improved by providing a larger number of thyristor bridges. With this control mode and in the case of the known control system, the alternating current suddenly rises to its peak value $I_D'$ during the safety angle $\gamma$, because the thyristors must always commutate (FIGS. 3a, 3b, 3c). Whatever the number of thyristor bridges, the harmonics can therefore not be reduced to any appreciable extent.

Figure 4:
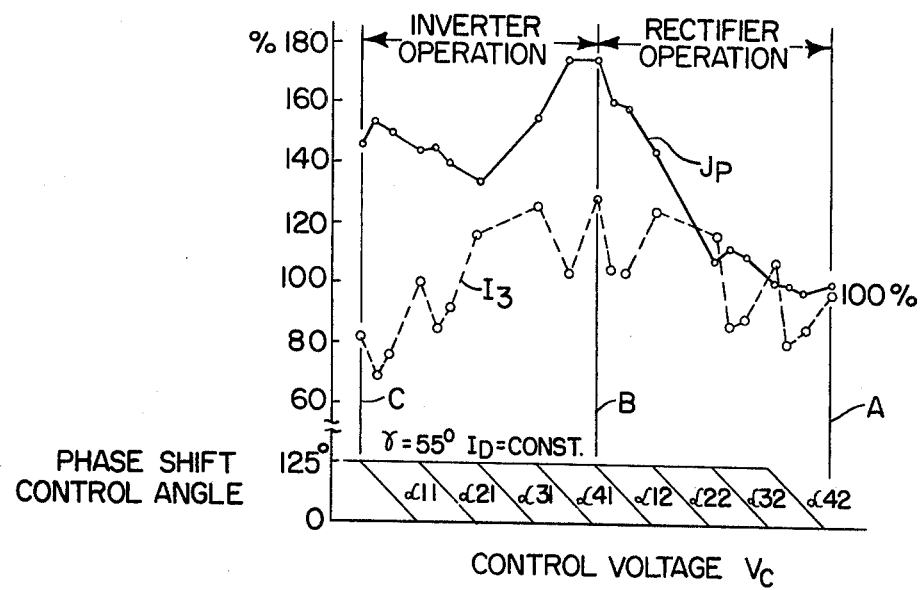
FIG. 4 is a diagram of the currents $J_P$ and $I_3$ versus the phase shift control angle.

FIG. 4 shows the third-order harmonic $I_3$ and the psophometric noise current $J_P$ in a system in which the transformer has four secondary coils and each secondary coil is connected to one thyristor bridge. The thyristor bridges are controlled in the order shown in the drawing, using phase shift control angles $\alpha_{11}$ to $\alpha_{42}$. The psophometrically evaluated noise current $J_P$ is defined in that the fundamental-frequency current and each harmonic current $I_n$ ($n = 3, 5, 7...$) of the alternating current flowing through the primary coil of the transformer is weighted with a coefficient $S_n$, according to the following equation laid down by the CCITT (Comite Consultatif International Telegraphique et Telephonique):

$$J_P = \sqrt{\sum_{n=3}^{\infty} (S_n I_n)^2} \qquad (3)$$

In FIG. 4, three conditions are emphasized as follows:

Condition A

All phase shift control angles $\alpha_{11}$ to $\alpha_{42} = 0°$. Under this condition, the static power converter operates as a rectifier and generates positive peak voltage.

Condition B $$\alpha_{11} = \alpha_{21} = \alpha_{31} = \alpha_{41} = 0°$$
$$\alpha_{12} = \alpha_{22} = \alpha_{32} = \alpha_{42} = 180° - \gamma$$

Transition from rectifier to inverter operation.

Condition C

All phase shift control angles $\alpha_{11}$ to $\alpha_{42} = 180° - \gamma$. Under this condition, the static power converter operates as an inverter and generates negative peak voltage.

These conditions occur invariably during conversion, irrespective of the number of thyristor bridges used and irrespective of the control mode.

If, with condition A, the level of $J_P$ is set at 100%, conditions B and C will produce values of 175 and 145% respectively. FIG. 4 also shows that the maximum level of the harmonic current $I_3$ rises strongly in the vicinity of condition B. This increase of $J_P$ and $I_3$ is tantamount to strong interference in the telecommunication cables. The countermeasure hitherto adopted was to provide filter elements on the A.C. side of the static power converter which would reduce the harmonic currents. If this remedy is to be successful, large filter elements have to be used. However, the costs of such a filter element rise with its size, while its efficiency is not improved in the same proportion as the costs.

BRIEF SUMMARY OF THE INVENTION

The present invention has as an object the provision of a static power converter in which the psophometrically evaluated noise current is reduced in comparison with known static power converters. Moreover, the harmonics are to be reduced without using filter elements, in order to achieve an inexpensive assembly of small overall dimensions.

According to the invention, this object is achieved in that the level of the control voltage is measured by a level detector and a signal corresponding to the measured level is generated which causes one thyristor bridge to keep the direct voltage at its output substantially to zero, whereas the other thyristor bridge operates with phase shift control.

DETAILED DESCRIPTION OF THE INVENTION

Figure 5:
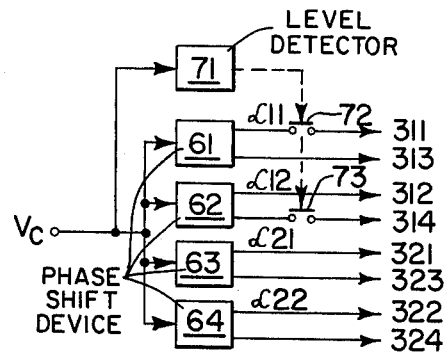
FIG. 5 depicts a control system of the invention in diagrammatic representation.

According to FIG. 5, a level detector 71 measures the level of the control voltage $V_C$. The switches 72 and 73 are switched on and off by means of the output signal of level detector 71, so that the ignition signals for the thyristors 311 and 314 become effective or ineffective in accordance with the measured level. The other reference symbols of FIG. 5 are the same as those of FIG. 1b. Here, too, the main circuit is the diagram shown in FIG. 1a.

Figure 6:
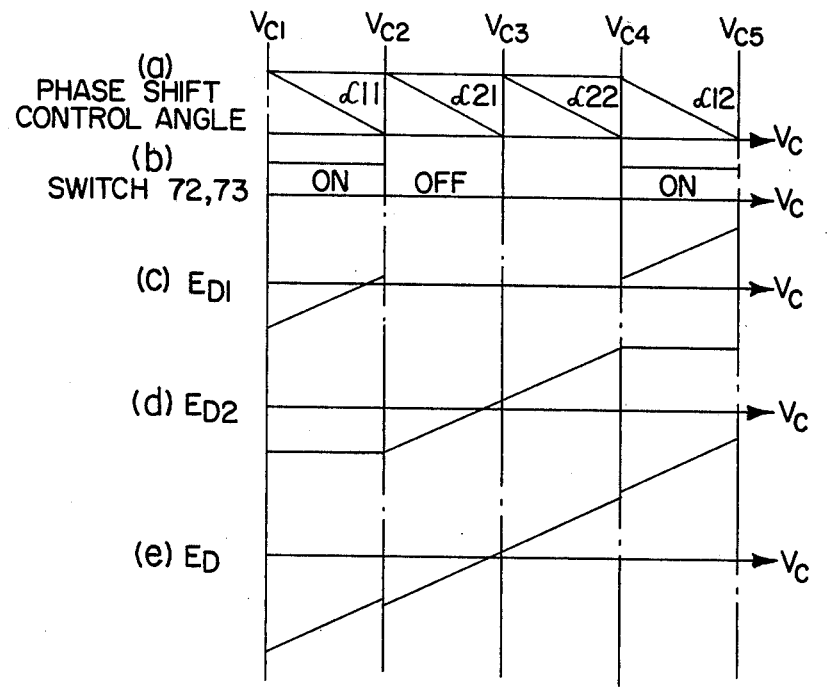
FIGS. 6 and 7 are diagrams displaying the variation of the various direct voltages in dependence on the phase shift control angle, and direct voltage and alternating voltage characteristics (corresponding to FIGS. 2 and 3)

The phase shift control angles $\alpha_{11}$ to $\alpha_{22}$, as well as the switches 72 and 73, are controlled in accordance with the control voltage $V_C$ (FIGS. 6a, b). In the first region ($V_{C1} < V_C < V_{C2}$), the phase shift control angle $\alpha_{11}$ of the thyristors 311 and 313 is varied while the switches 72 and 73 are switched on. The level of the direct voltage $E_{D1}$ of the thyristor bridge 31 therefore lies in the negative region ($V_{C1} < V_C < V_{C2}$ in FIG. 6c). In this region, the direct voltage $E_{D1}$ thus varies in accordance with the known main circuit arrangement. As the control voltage $V_C$ increases and reaches the level $V_{C2}$, $\alpha_{11}$ being 0°, the level detector 71 causes the switches 72 and 73 to be off (region $V_{C2} < V_C < V_{C3}$ in FIG. 6b). The result is that the ignition signals of thyristors 311 and 314 are interrupted. Commutation from thyristor 313 to thyristor 311, and from thyristor 312 to thyristor 314 is thus inhibited.

Thereafter, the current continues to flow through thyristors 312 and 313. This means that the thyristor bridge 31 continues to be in the conductive state on the D.C. side, whereas it is continuously interrupted by thyristors 311 and 314 on the A.C. side.

Before and after the interruption of the ignition signals for thyristors 311 and 314, the output D.C. voltage of the thyristor bridge 31 varies because the interruption takes place under the condition $\alpha_{11} = 0°$ and $\alpha_{12} = 180° - \gamma$. This potential difference results from equation (1):

$$0.9 E_{21} \frac{\cos 0° + \cos(180° - \gamma)}{2} = 0.9 E_{21} \frac{1 - \cos \gamma}{2} \qquad (4)$$

According to the above equation, this potential difference can be reduced to zero if the ignition signal is interrupted when phase angle $\alpha_{11} = \gamma$.

Between the control voltages $V_{C2}$ and $V_{C4}$ the thyristor bridge 32 is phase-shift controlled while the thyristor bridge 31 is shorted on the D.C. side (region $V_{C2} < V_C < V_{C4}$ in FIGS. 6c, d). With control voltage $V_{C4}$, the direct voltage $E_{D2}$ of the thyristor bridge 32 reaches its positive maximum. At this point the level detector 71 operates again, so that the switches 72 and 73 are "on" again. Thyristors 311 and 314 again receive ignition signals. The thyristor bridge 31 begins commutating. Phase shift control of the thyristor bridge 31 is thus made possible. With control voltage $V_{C5}$, also the direct voltage $E_{D1}$ of the thyristor bridge 31 reaches its positive maximum. In the abovedescribed control system, the full or total direct voltage $E_D$ follows the characteristic shown in FIG. 6e between the negative and positive peaks.

Figure 7:
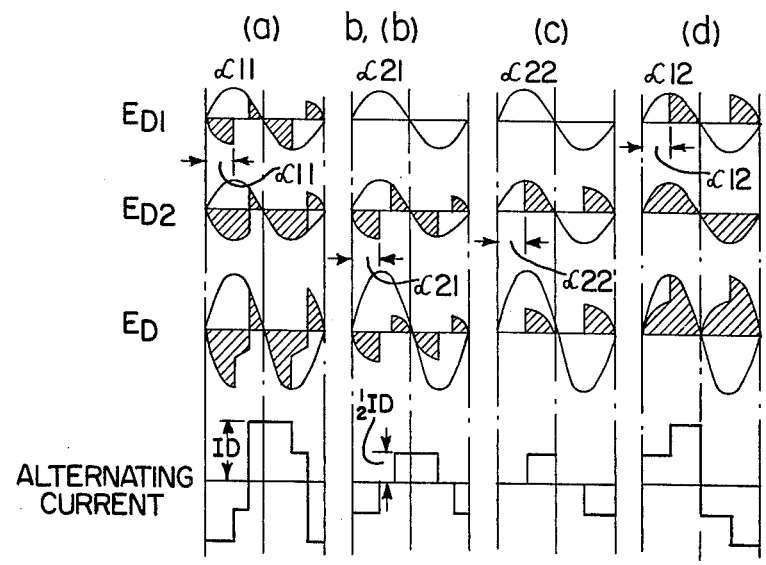

FIG. 7 shows the wave forms of the direct voltages and the alternating current in the case of the control system of the invention. As shown in FIGS. 7b and 7c, the alternating current is determined only by the functioning of the thyristor bridge 32 while commutation of thyristor 31 is blocked (i.e. in the region $V_{C2}<V_C<V_{C4}$ in FIG. 6), so that its amplitude decreases. If we assume that the alternating voltages E21 and E22 of the secondary coils 21 and 22 are equal, then the amplitude of the alternating current is only half that of the known control system. Consequently, the harmonic $I_n$ as well as the psophometrically evaluated current $J_P$ can be reduced in the region of low output D.C. voltages $E_D$.

Figure 8:
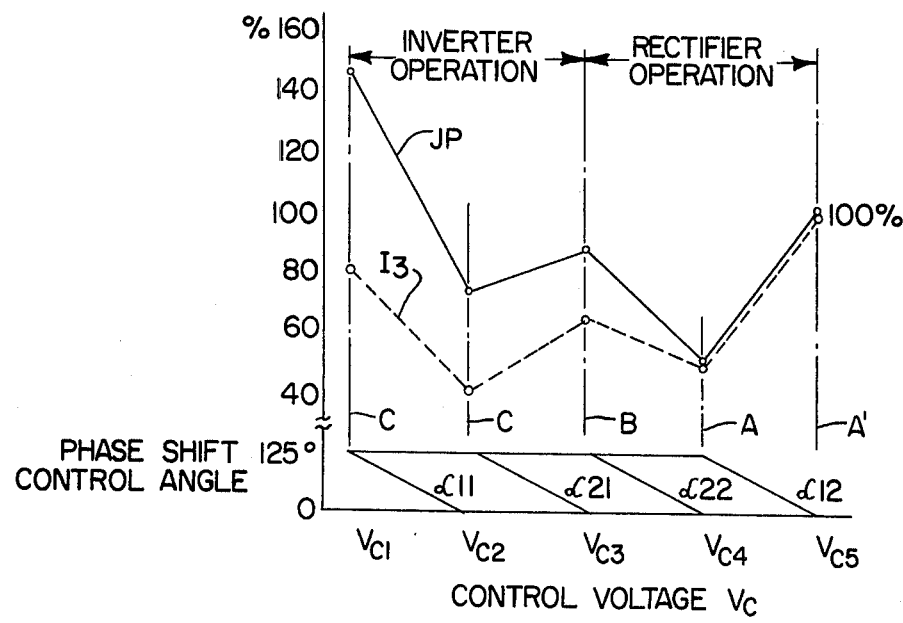
FIG. 8 shows in diagrammatic representation, the currents $J_P$ and $I_3$ versus the phase shift control angle, and the control voltages.

The advantages gained by the present invention are illustrated very well by a comparison between FIGS. 4 and 8. In state B($V_C = V_{C3}$), i.e. at the border between rectifier and inverter operation, the alternating current is only half that shown for state B in FIG. 4. Consequently, also $J_P$ and $I_3$ are reduced to half their values. In the other states shown in the drawing, they are likewise reduced. When the number of the series-connected thyristor bridges is increased, the currents $J_C$ and $I_3$ are reduced accordingly. With three secondary coils, $J_P$ and $I_3$ decrease to one-third and with four secondary coils to one-fourth. This makes filter elements for reducing the harmonics superfluous, so that small overall dimensions and low weight can be achieved for the static power converter or not.

It should be noted that it is immaterial for the purposes of the present invention how many secondary coils are provided in the transformer and also whether the voltages of these secondary coils are equal to one another.

Figure 9A:
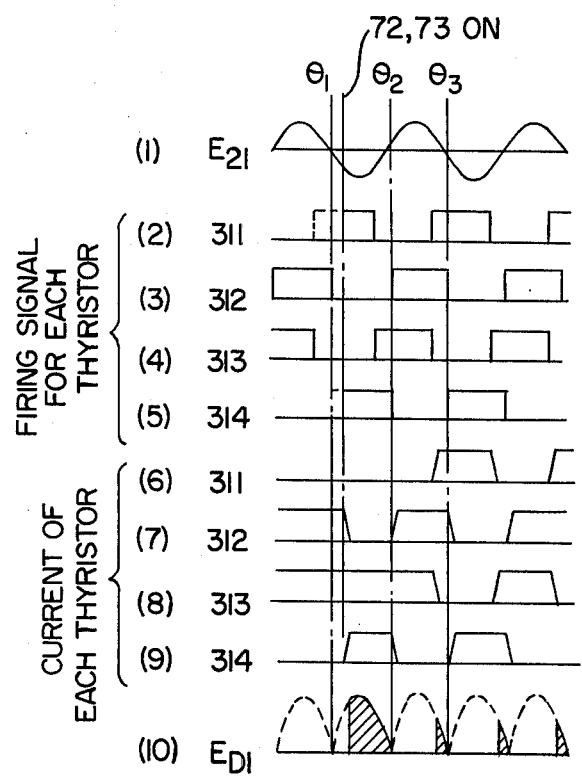
FIGS. 9a and 9b illustrate voltage and current characteristics, to illustrate another problem and its solution.

In order to avoid unsteadiness in operation, due to intermittent direct current, it is possible to employ thyristor bridges driven to full output, with wide-pulse ignition signals for the thyristors. The ignition signals may be interrupted during any desired phase also in this case. But if the phase coincides with the renewed application of the ignition signal, a direct voltage is produced during the first half-wave at the output terminals of the thyristor bridge whose level is the same as the amplitude of the alternating voltage E21 or E22. FIG. 9a illustrates this problem.

If the ignition signal for thyristor 311 is given midway through the normal duration of its ignition signal (FIG. 9a (2)), then a large direct voltage $E_{D1}$ results during the first half-wave (FIG. 9a (10)). If the D.C. circuit contains a sufficiently high inductance, the above-mentioned problem is virtually negligible. However, sudden voltage variations are generally undesirable If a sudden voltage variation is to be avoided, the ignition signal for thyristor 311 should coincide with a phase in such a way that it attains its full width from the outset (FIG. 9b (2)). The switches 72 and 73 should therefore be switched on during a period of time P.

Figure 9B:
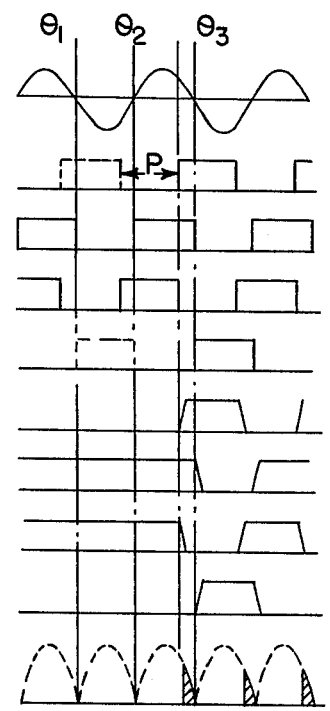
Figure 10:
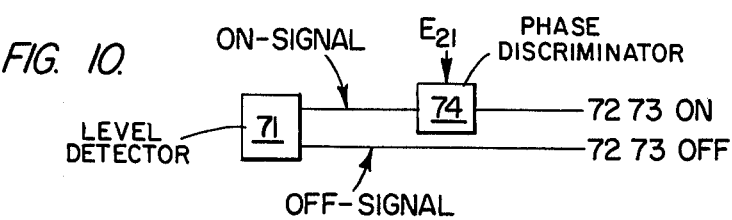
FIG. 10 is a circuit diagram of another control system.

FIG. 10 shows diagrammatically a device by means of which the switches 72 and 73 are switched on during a period of time P. The device comprises a phase discriminator 74 which receives the alternating voltage $E_{21}$ as its input signal to allow phase discrimination. The "on" signal from the level detector 71 is thus transmitted to the switches 72 and 73 via the phase discriminator 74 only during the period of time P. As a result, the direct voltage is kept regular from the outset (FIG. 9b (10)).

In the above-described embodiment the current rating of thyristors 312 and 313 must be twice as high as that of the thyristors in the conventional circuit because, during the interruption of the ignition signals for thyristors 311 and 314, the direct current $I_D$ will only pass through thyristors 312 and 313.

Given the above-stipulated conditions, the invention can be successfully applied in the following embodiments.

Figure 11:
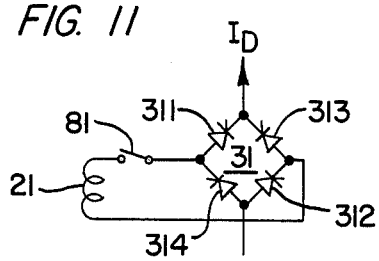
FIGS. 11 and 12 show, in diagrammatic representation, circuit diagrams of other main circuit configurations.

FIG. 11 shows part of the main circuit. An isolating switch 81 is provided which is operated by the signal of the level detector 71. By means of switch 81, the thyristor bridge 31 is isolated from the secondary coil 21, whereas the other thyristor bridge 32 (not shown in FIG. 11) operates with phase shift control. During this time, the thyristor bridge 31 remains conductive on the D.C. side. When the switch 81 is switched off, following the interruption of the ignition signals for thyristors 311 and 314, the disconnection takes place without the passage of current, i.e. without arcing. The direct current $I_D$ temporarily flows only through thyristors 312 and 313, but the ignition signals are applied again to thyristors 311 and 314 immediately afterwards, so that the direct current $I_D$ is branched. Usually, thyristors with identical forward voltage characteristics are employed. The direct current $I_D$ is thus uniformly shunted into each branch of the thyristor bridge. Consequently, the thyristors 312 and 313 need not have a higher current rating. When the switch 81 is switched on again, the phase angle of the ignition signals for thyristors 311 and 314 is fixed to a certain value in advance (FIG. 9b).

Figure 12:
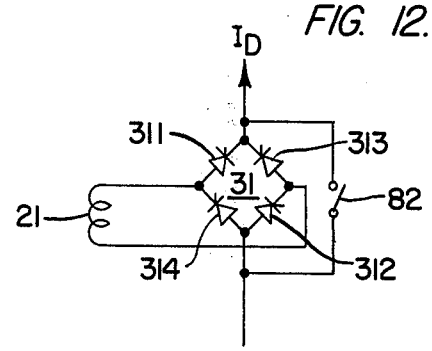

FIG. 12 shows another embodiment for solving the above-mentioned problem. On the D.C. side the thyristor bridge 31 is provided with a short-circuiting switch 82 which bypasses the thyristor bridge 31, while the other thyristor bridge 32 (not shown here) operates with phase shift control. The switch 82 is operated and switched on in conjunction with the output signal of the level detector 71, while thyristors 312 and 313, after the thyristor bridge 31 has been driven to full output, remain in the conductive state or are restored to the conductive state following the interruption of their ignition signals. As a result, switch 82 is switched on without the passage of a current, i.e. without arcing. When switch 82 has been switched on, the entire direct current $I_D$ flows exclusively via switch 82, but not via thyristors 312 and 313, because the resistance of the switch 82 is very low. When the switch 82 is switched on again, the ignition signals are first fed to the thyristors 312 and 313. The switch 83 is switched off when thyristors 312 and 313 conduct, so that here, too, arcing cannot occur. One advantage of this embodiment of the invention must be seen in the fact that thyristors with a low current rating can be used in thyristor bridge 31, always provided that the static power converter during protracted periods is run with a low direct voltage and that the thyristor bridge 31 operates only for short periods.

Figure 13:
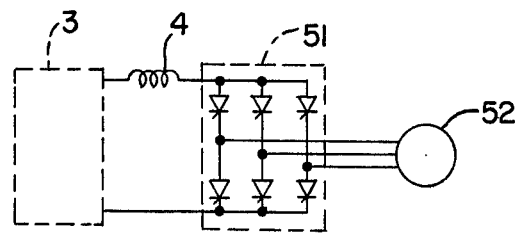
FIG. 13 depicts another application of the invention.

The use of the static power converter of the invention is by no means confined to the supply of D.C. motors. It can be used to supply any kind of D.C. load. FIG. 13 shows an embodiment illustrating such an aspect. Here, the D.C. load consists of a so-called thyristor motor (i.e. a motor in which mechanical commutator segments are replaced by thyristors). This assembly consists of a controlled inverter 51 and an A.C. motor 52.

The static power converter of the invention is not subject to any limitations with regard to the type and sequence of the ignition signals applied to the thyristor bridges.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. In a static power converter comprising a transformer having a number of separate secondary coils, a converter assembly driven to its full output and consisting of a number of thyristor bridges for the bilateral conversion of A. C. power into D. C. power and vice versa, each of which is connected to one of these secondary coils and all of which are connected in series configuration on the D. C. side, the improvement comprising a device for the phase shift control of the thyristor bridges in dependence on a control voltage, the level of this control voltage being detected by a level detector and a signal generated in accordance with said level by means of which the output D. C. voltage of one thyristor bridge is maintained at zero, whereas another thyristor bridge operates with phase shift control.

2. In a static power converter comprising a transformer having a number of separate secondary coils, a converter assembly driven to its full output and consisting of a number of thyristor bridges for the bilateral conversion of A. C. power into D. C. power and vice versa, each of which is connected to one of these secondary coils and all of which are connected in series configuration on the D. C. side, the improvement comprising a device for the phase shift control of the thyristor bridges in dependence on a control voltage, the level of this control voltage being detected by a level detector and a signal generated in accordance with said level by means of which the output D. C. voltage of one thyristor bridge is maintained at a small value no greater than the voltage drop across a conducting thyristor bridge whereas another thyristor bridge operates with phase shift control, characterized in that one thyristor bridge is connected to the secondary coil of the transformer by means of a switch controlled by the level detector.

3. An improved static power converter according to claim 1, characterized in that a switch, controlled by the level detector, is connected in parallel with one of the thyristor bridges.

4. An improved static power converter according to claim 1, wherein the phase shift device and level detector provide for the reduction of the level of harmonic components produced by the bilateral conversion of A. C. power into D. C. power and vice versa.

* * * * *